(12) United States Patent
Christmas

(10) Patent No.: US 12,111,616 B2
(45) Date of Patent: Oct. 8, 2024

(54) HEAD-UP DISPLAY

(71) Applicant: Envisics Ltd, Milton Keynes (GB)

(72) Inventor: Jamieson Christmas, Milton Keynes (GB)

(73) Assignee: Envisics Ltd (GB)

( * ) Notice: Subject to any disclaimer, the term of this patent is extended or adjusted under 35 U.S.C. 154(b) by 727 days.

(21) Appl. No.: 17/057,331

(22) PCT Filed: Jun. 12, 2019

(86) PCT No.: PCT/EP2019/065401
§ 371 (c)(1),
(2) Date: Nov. 20, 2020

(87) PCT Pub. No.: WO2020/015933
PCT Pub. Date: Jan. 23, 2020

(65) Prior Publication Data
US 2021/0191319 A1 Jun. 24, 2021

(30) Foreign Application Priority Data
Jul. 18, 2018 (GB) ..................... 1811738

(51) Int. Cl.
*G02B 13/00* (2006.01)
*G02B 9/64* (2006.01)
(Continued)

(52) U.S. Cl.
CPC ....... *G03H 1/2294* (2013.01); *G02B 27/0172* (2013.01); *G03H 1/08* (2013.01);
(Continued)

(58) Field of Classification Search
CPC ................ G02B 27/0093; G02B 27/01; G02B 27/0103; G02B 27/0105; G02B 27/0107;
(Continued)

(56) References Cited

U.S. PATENT DOCUMENTS 5,692,082 A * 11/1997 Fukushima .......... G02B 6/4206
385/35
9,625,718 B2 * 4/2017 Rossini .............. G02B 27/0103
(Continued)

FOREIGN PATENT DOCUMENTS

EP 0886802 B1 11/2001
EP 2546087 A1 1/2013
(Continued)

OTHER PUBLICATIONS

International Search Report and Written Opinion of International Searching Authority, Application No. PCT/EP2019/065401, mailed Jul. 31, 2019, 12 pages.
(Continued)

*Primary Examiner* — Nicholas R. Pasko
*Assistant Examiner* — Samanvitha Sridhar
(74) *Attorney, Agent, or Firm* — McDonnell Boehnen Hulbert & Berghoff LLP

(57) ABSTRACT

There is provided a head-up display having an eye-box comprising a driver monitoring system, picture generating unit and optical system. The driver monitoring system is arranged to illuminate and monitor a driver. The driver monitoring system comprises a first display channel. The picture generating unit is arranged to display a picture on a replay plane. The picture generating unit comprises a second display channel. Each display channel comprises a light source, spatial light modulator and controller. Each light source is arranged to emit light. Each spatial light modulator is arranged to receive light from the respective light source and output spatially-modulated light in accordance with a computer-generated hologram displayed on the spatial light modulator to form a respective light pattern on the replay plane. Each controller is arranged to output the computer-generated hologram to the spatial light modulator. The (Continued)

optical system is arranged to relay each light pattern from the replay plane. The optical system comprises an input, output and at least one mirror. The input is arranged to receive light of each light pattern. The output is arranged to output light of each light pattern. The at least one mirror is arranged to guide light from the input to the output along an optical path. The light pattern formed by the first display channel is an infrared light pattern. Each light pattern is a holographic reconstruction.

18 Claims, 9 Drawing Sheets

(51) Int. Cl.
    *G02B 27/01*     (2006.01)
    *G03H 1/08*     (2006.01)
    *G03H 1/22*     (2006.01)
(52) U.S. Cl.
    CPC ... *G03H 1/2205* (2013.01); *G02B 2027/0174* (2013.01); *G02B 2027/0178* (2013.01); *G02B 2027/0187* (2013.01); *G03H 2222/12* (2013.01); *G03H 2222/16* (2013.01); *G03H 2223/24* (2013.01); *G03H 2225/34* (2013.01)
(58) Field of Classification Search
    CPC .............. G02B 27/017; G02B 27/0172; G02B 27/1006; G02B 27/1013; G02B 27/102; G02B 27/1026; G02B 27/1046; G02B 27/141; G02B 27/4294; G02B 2027/0138; G02B 2027/014; G02B 2027/0174; G02B 2027/0178; G02B 2027/0181; G02B 2027/0187; G02B 2027/0198; G02B 5/32; G03H 2222/12; G03H 2222/16; G03H 2222/18; G03H 2222/31; G03H 2222/34; G03H 2225/30; G03H 2225/34; G03H 2225/60; G03H 2225/61; G03H 2226/05; G03H 1/02; G03H 1/08; G03H 1/2205; G03H 1/2294; G03H 2001/0224; G03H 2001/2236; G03H 2223/24; G06F 3/01; G06F 3/011; G06F 3/012; G06F 3/013
See application file for complete search history.

(56) References Cited

U.S. PATENT DOCUMENTS

| | | | |
|---|---|---|---|
| 2001/0043163 A1* | 11/2001 | Waldern | G02B 27/0093 |
| | | | 345/7 |
| 2010/0060551 A1 | 3/2010 | Sugiyama et al. | |
| 2010/0103485 A1* | 4/2010 | Haussler | G03H 1/08 |
| 2013/0044138 A1 | 2/2013 | Koga | |
| 2015/0009695 A1* | 1/2015 | Christmas | F21S 41/645 |
| | | | 362/466 |
| 2015/0022783 A1 | 1/2015 | Lee | |
| 2016/0033771 A1* | 2/2016 | Tremblay | G02B 26/10 |
| | | | 359/851 |
| 2018/0120768 A1 | 5/2018 | Christmas | |
| 2018/0196265 A1* | 7/2018 | Bouchier | G02B 3/0006 |
| 2019/0235240 A1 | 8/2019 | Nagano et al. | |

FOREIGN PATENT DOCUMENTS

| | | | |
|---|---|---|---|
| EP | 2936252 A1 | | 10/2015 |
| GB | 2557231 A | | 6/2018 |
| JP | H0264612 A1 | | 3/1990 |
| JP | 2010125910 A | * | 6/2010 |
| WO | 2016191709 A1 | | 12/2016 |
| WO | 2017/167483 A1 | | 10/2017 |
| WO | 2018/117012 A1 | | 6/2018 |

OTHER PUBLICATIONS

UKIPO Combined Search and Examination Report under Sections 17 and 18(3), Application No. GB1811738.2, mailed Jan. 21, 2019, 8 pages.

* cited by examiner

HEAD-UP DISPLAY

CROSS-REFERENCE TO RELATED APPLICATIONS

This application is a U.S. National Stage application of International Patent Application no. PCT/EP2019/065401, filed Jun. 12, 2019, which claims the benefit of priority of United Kingdom Patent Application no. 1811738.2, filed Jul. 18, 2018.

FIELD

The present disclosure relates to a holographic projector. More specifically, the present disclosure relates to a head-up display comprising at least one holographic projection channel. Some embodiments relate to a driver monitoring system for a head-up display. More specifically, some embodiments relate to an infrared holographic projector for a driver monitoring system of a head-up display. Some embodiments relate to an augmented reality head-up display, "AR-HUD", including eye-tracking or head-tracking. Other embodiments relate to a picture generating unit and integrated infrared holographic illuminator for head-tracking or eye-tracking.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

An AR-HUD typically includes a driver monitoring system having eye-tracking. Such systems require infrared, "IR", emitters to illuminate the driver with IR light. However, IR emitters are difficult to house within a vehicle and are aesthetically displeasing. There is disclosed herein a head-up display including an integrated IR light source for driver monitoring.

SUMMARY

Aspects of the present disclosure are defined in the appended independent claims.

There is provided a head-up display having an eye-box. The head-up display comprises a driver monitoring system, a picture generating unit and an optical system. The driver monitoring system is arranged to illuminate and monitor a driver. The driver monitoring system comprises an infrared display channel. The infrared display channel comprises an infrared light source and a hologram. The infrared light source is arranged to emit infrared light. The hologram is arranged to receive the infrared light from the infrared light source and output spatially-modulated light in accordance with the hologram to form an infrared light pattern on a replay plane. The picture generating unit is arranged to display a picture on the replay plane. The picture generating unit comprises a visible light display channel. The visible light display channel comprises a visible light source, a spatial light modulator and a controller. The visible light source is arranged to emit visible light. The spatial light modulator is arranged to receive the visible light from the visible light source and output spatially-modulated light in accordance with a computer-generated hologram displayed on the spatial light modulator to form a visible light pattern on the replay plane. The controller is arranged to output a light-modulation distribution comprising the computer-generated hologram to the spatial light modulator. The optical system comprises an input, output and at least one mirror. The input is arranged to receive the infrared light pattern and the visible light pattern. The output is arranged to output light of the infrared light pattern and light of the visible light pattern. The at least one mirror is arranged to guide light from the input to the output along an optical path.

The light of the infrared light pattern and light of the visible light pattern which is output by the optical system may be diverging. This light may be received by an optical combiner and directed to the eye-box. A virtual image of the visible light pattern is viewable from an eye-box area or volume. In normal operation, a viewer (e.g. driver) is positioned within their eyes within the eye-box area. The eye-box allows for some head movement of the viewer whilst ensuring the virtual image is still visible. The optical combiner may be the windscreen of a vehicle housing the head-up display. It may be said that the optical system of the head-up display and the optical combiner of the vehicle collectively form a virtual image of the visible light pattern. The optical system and optical combiner also collectively direct infrared light to the eye-box. The eye-box area or volume is inside the vehicle and the virtual image appears in the distance outside the vehicle. The distance to the virtual image is principally determined by the optical power of the optical system and/or optical combiner. There is therefore provided a head-up display system including the head-up display and an optical combiner arranged to receive light output by the optical system and form a virtual image of each light pattern. The virtual image of the infrared light pattern is, of course, not visible to the viewer but the infrared light reflected to the eye-box by the optical combiner illuminates the viewer.

The light-modulation distribution comprises an [m×n] array of light-modulation values. The light-modulation distribution may comprise a plurality of components, wherein each component comprises an [m×n] array of light-modulation values. The computer-generated hologram may be considered a first component of the light-modulation distribution. Additional components may be combined with the computer-generated hologram by addition to form the light-modulation distribution. That is, corresponding elements of one or more further [m×n] arrays of light-modulation values may be added to form the light-modulation distribution. A second component of the light-modulation distribution may correspond to a lensing function which at least partially determines the distance from the spatial light modulator to the focal plane (i.e. holographic replay plane) of the light pattern (e.g. z-position in a Cartesian coordinate system in which the z-direction is the direction of the optical axis). The lens function may be a Fresnel function comprising an [m×n] array of phase-modulation values. A third component of the light-modulation distribution may correspond to a grating function or beam-steering function which controls the position of the light pattern on the focal plane (e.g. x-y position). The grating function may also comprise an [m×n] array of phase-modulation values. The grating function may be a phase-ramp such as a modulo $2\pi$ phase-ramp. That is, the array of phase-modulation values of the grating function may linearly increase across the array in one direction (e.g. x-direction) or two orthogonal directions (e.g. x-direction and y-direction).

The computer-generated hologram is calculated from an input image or pattern. The aim is for the holographic reconstruction to be a faithful reproduction of the input image. In some embodiments described herein, the computer-generated hologram is phase hologram. In some embodiments described herein, the phase hologram is calculated using an iterative phase retrieval algorithm based on the Gerchberg-Saxton algorithm. In some embodiments, computer-generated holograms are calculated in real-time. In other embodiments, computer-generated holograms are retrieved from a repository or memory comprising a plurality of computer-generated holograms. The computer-generated hologram is calculated from the input image. The computer-generated hologram is a hologram of the image, wherein the hologram is generated by a computer-implemented algorithm. The image is an input to a hologram calculation engine.

The optical system and an optical combiner of the vehicle (e.g. windscreen or pop-up dashboard combiner) relay light of the light patterns formed at the replay plane. Optionally, the optical system and/or optical combiner provide magnification of the light pattern. Specifically, the optical system and optical combiner may form a magnified virtual image of the light pattern. However, the relaying may not be perfect. That is, the virtual image observed from the eye-box may not be a perfect copy of the light pattern. For example, the virtual image may be distorted or warped by the optical system and/or optical combiner. In some embodiments, the input image is processed before the computer-generated hologram is calculated to compensate for the optical system and/or optical combiner. This processing is referred to herein as "pre-processing" to indicate that it occurs before the hologram is calculated. Pre-processing of the image may comprise altering (such as counter-distorting or counter-warping) the image to compensate for the optical response of the optical system and/or optical combiner.

There is disclosed herein a head-up display comprising a plurality of single-wavelength (or single colour) display (or light) channels each comprising a respective light source and display component (e.g. hologram or spatial light modulator). Each display channel forms a respective light pattern. An infrared light pattern and visible light pattern are formed on the same replay plane. The infrared light pattern and visible light pattern may be substantially coincident or superimposed. The visible light pattern may convey useful information—such as navigation information—to a viewer (e.g. driver). The visible light pattern is a picture or a single colour component of a picture. The infrared light pattern is provided to illuminate the viewer. The picture is only viewable within an eye-box area primarily defined by the optical system. The infrared light and visible light are relayed by the same optical system and optical combiner to an eye-box area or volume for a viewer. The inventor recognised that this conveniently confines the infrared light to the eye-box area. This is advantageous because it means that infrared light energy is not wasted illuminated areas from where the picture cannot be seen.

The head-up display is arranged to illuminate the eye-box with infrared light. The infrared light is used to increase the signal to noise ratio of images of the viewer (e.g. driver) captured by an image capture device. In accordance with the present disclosure, all infrared light from the infrared display channel may be directed to the eye-box. This provides energy efficiency.

The infrared light pattern formed by the infrared display channel may be a structured light pattern. A structured light pattern is a light pattern having a controlled shape. A structured light pattern may comprise light and dark regions arranged to provide selective infrared illumination of the eye-box. The infrared light pattern may be structured or shaped in any conceivable way. For example, it may be advantageous to direct infrared light away from some areas of the eye-box and/or concentrate infrared light to other areas of the eye-box.

The infrared intensity of the light areas in the eye-box may be substantially uniform. This may be achieved by forming a substantially non-uniform intensity infrared light pattern on the replay plane. The non-uniformity in the infrared intensity of the light areas on the replay plane may compensate for spatially-variant optical losses in the optical system and/or optical combiner. In embodiments in which the hologram of the infrared channel is a computer-generated hologram displayed on a spatial light modulator, the hologram is dynamically-changeable in response to movement of the viewer to maintain uniform illumination of the light areas.

The infrared display channel may be at least partially integrated with the visible light channel to provide a compact design. For example, at least a portion of the infrared display channel may be substantially collinear with a corresponding portion of the visible light display channel.

The driver monitoring system may comprise an image capture device (e.g. camera such as an infrared camera) arranged to capture images (i.e. infrared images) of the viewer (e.g. driver). The image capture device may be disposed or positioned behind a mirror of the at least one mirror of the optical system. For example, one of the mirrors of the optical system may be transparent to infrared light reflected off the viewer and passing back through the optical system. The mirror may be reflected to the infrared light on a first pass from replay plane to viewer and transmissive on the second pass from viewer towards replay plane. This may be achieved in a variety of ways using, for example, polarisation and a polarisation rotation between the first pass and second pass.

The hologram may be a computer-generated hologram. The infrared display channel may further comprise a spatial light modulator and a controller. The spatial light modulator is arranged to display the computer-generated hologram. The controller is arranged to output a light modulation distribution comprising the computer-generated hologram to the spatial light modulator. The infrared light pattern is therefore dynamically reconfigurable. For example, the infrared light pattern may be reconfigured in accordance of movement of the viewer within the eye-box or a change in ambient light conditions, for example.

There is therefore provided a head-up display having an eye-box comprising a driver monitoring system, picture generating unit and optical system. The driver monitoring system is arranged to illuminate and monitor a driver. The driver monitoring system comprises a first display channel. The picture generating unit is arranged to display a picture on a replay plane. The picture generating unit comprises a second display channel. Each display channel comprises a light source, spatial light modulator and controller. Each light source is arranged to emit light. Each spatial light modulator is arranged to receive light from the respective light source and output spatially-modulated light in accordance with a computer-generated hologram displayed on the spatial light modulator to form a respective light pattern on the replay plane. Each controller is arranged to output the computer-generated hologram to the spatial light modulator. The optical system is arranged to relay each light pattern from the replay plane. The optical system comprises an input, output and at least one mirror. The input is arranged to receive light of each light pattern. The output is arranged to output light of each light pattern. The at least one mirror is arranged to guide light from the input to the output along an optical path. The light pattern formed by the first display channel is an infrared light pattern. Each light pattern is a holographic reconstruction.

The driver monitoring system may further comprise an image processor. The image processor is arranged to receive captured images of the viewer from the image capture device. The image processor is further arranged to provide an input to a controller. The controller uses the input to determine the light modulation distribution displayed on the corresponding spatial light modulator. Accordingly, a feedback system is provided in which images of the viewer are analysed and the projected light patterns changed in response to data extracted from the images of the viewer. For example, a light pattern may be changed in response to head or eye movement of the viewer. This feedback system may be used with any number of the display channels including visible and infrared display channels.

In some embodiments, correction data (e.g. a correction map or correction matrix) is provided for each display channel. That is, infrared correction data is provided for the infrared display channel and visible light correction data is provided for the visible light channel. The correction data compensates for the optical response of the optical system and/or optical combiner. The correction data is the data used for pre-processing images. Correction data is provided for each display channel and for each of a plurality of eye positions within the eye-box. The nearest correction data may be provided for the eye position detected by the driver monitoring system.

The controller of the infrared display channel is therefore further arranged to receive a first input and second input. The controller is further arranged to determine a light-modulation distribution based on the first and second input. The first input comprises an input infrared image for projection using infrared light. The second input comprises the infrared correction data.

The controller of the visible light display channel is likewise further arranged to receive a first input and second input. The controller is further arranged to determine a light-modulation distribution based on the first and second input. The first input comprises an input visible light image for projection using visible light. The second input comprises the visible light correction data.

The first input may be the image for projection. The second input may be a correction map or correction matrix comprising an array of correction values. The controller may be arranged to multiple the image by the correction matrix to form a pre-processed image for hologram calculation. The correction matrix may be retrieved from memory based on a measured eye position. The correction matrix for each eye position and each wavelength may be determined by an in-situ calibration process or by computer simulation. Each correction matrix may provide translation, rotation and/or magnification. Additionally, or alternatively, each correction matrix may change the brightness value of image pixels. In some embodiments, each correction matrix is a brightness gain matrix arranged to compensate for system-wide optical losses.

The hologram of the infrared display channel may be a fixed holographic recording in a recording medium. That is, the hologram is not essentially a computer-generated hologram displayed on a spatial light modulator. The holographic reconstruction may be a fixed structured light pattern. The fixed structured light pattern may comprise regularly spaced horizontal and vertical gridlines.

The light source for each display channel may be a laser diode configured to emit polarised light. The polarisation of the light from the laser diode may be orientated such that reflection off the optical combiner is efficient. For example, the angle of reflection off the optical combiner may be approximately equal to Brewster's angle.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "replay image" and "image region" refer to areas of the replay field illuminated by light of the holographic reconstruction. In some embodiments, the "replay image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Reference is made throughout this disclosure to the "eye-box" of a head-up display. The eye-box is a viewing window for the head-up display image content. The viewer can only see the head-up display image content if they look through this window. The viewer is positioned to look through the eye-box at a real-world scene. The head-up display image content provides augmented reality information for the viewer.

Reference is also made to single colour or single wavelength display channels. However, as the person skilled in the art will understand, the described light sources may not be perfect and each display channel may in fact comprise light within a narrowband of wavelengths (e.g. +/−20 nm of a centre wavelength). Single wavelengths referred to herein are centre wavelengths of a narrow band of wavelengths.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
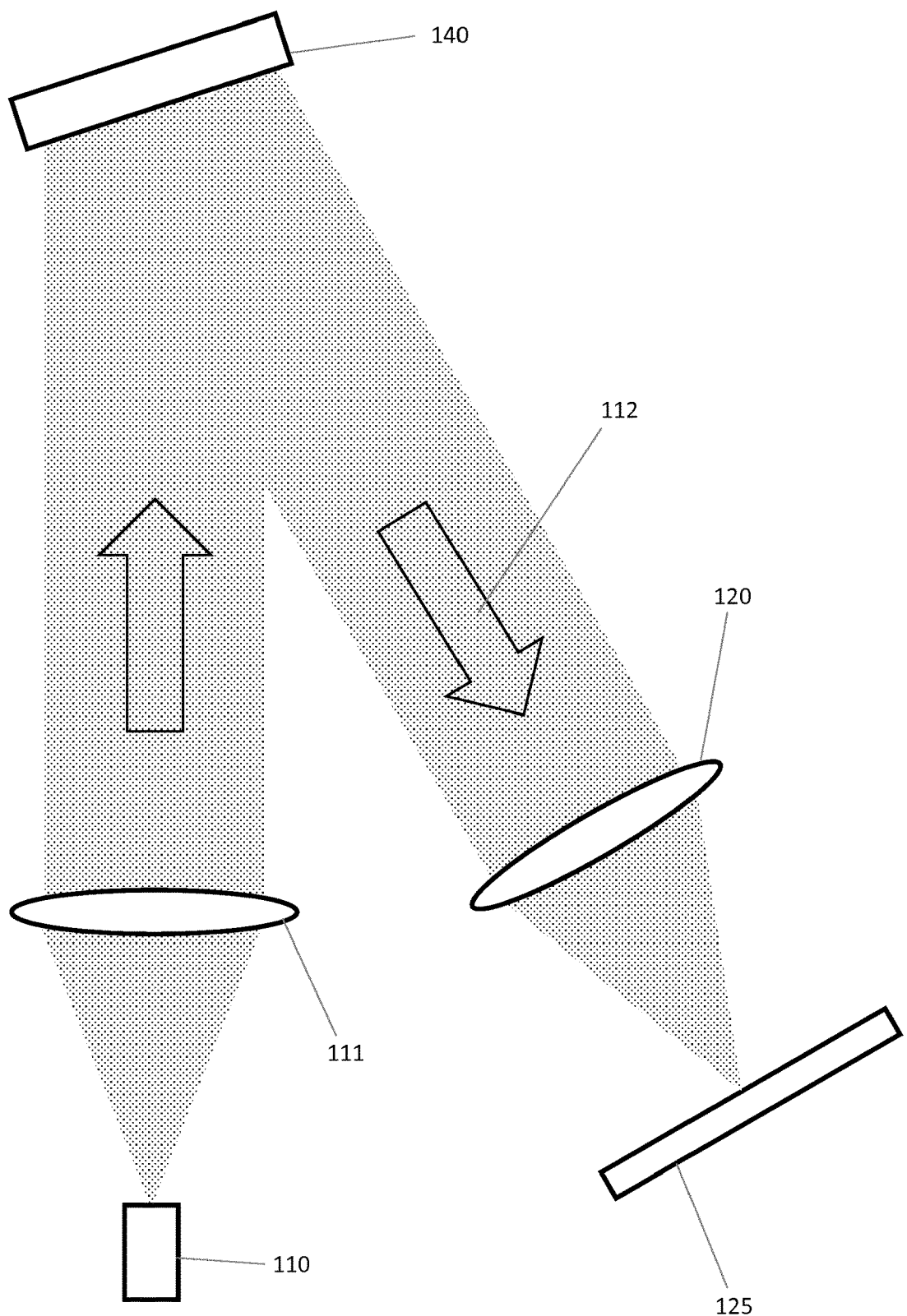
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information Y [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
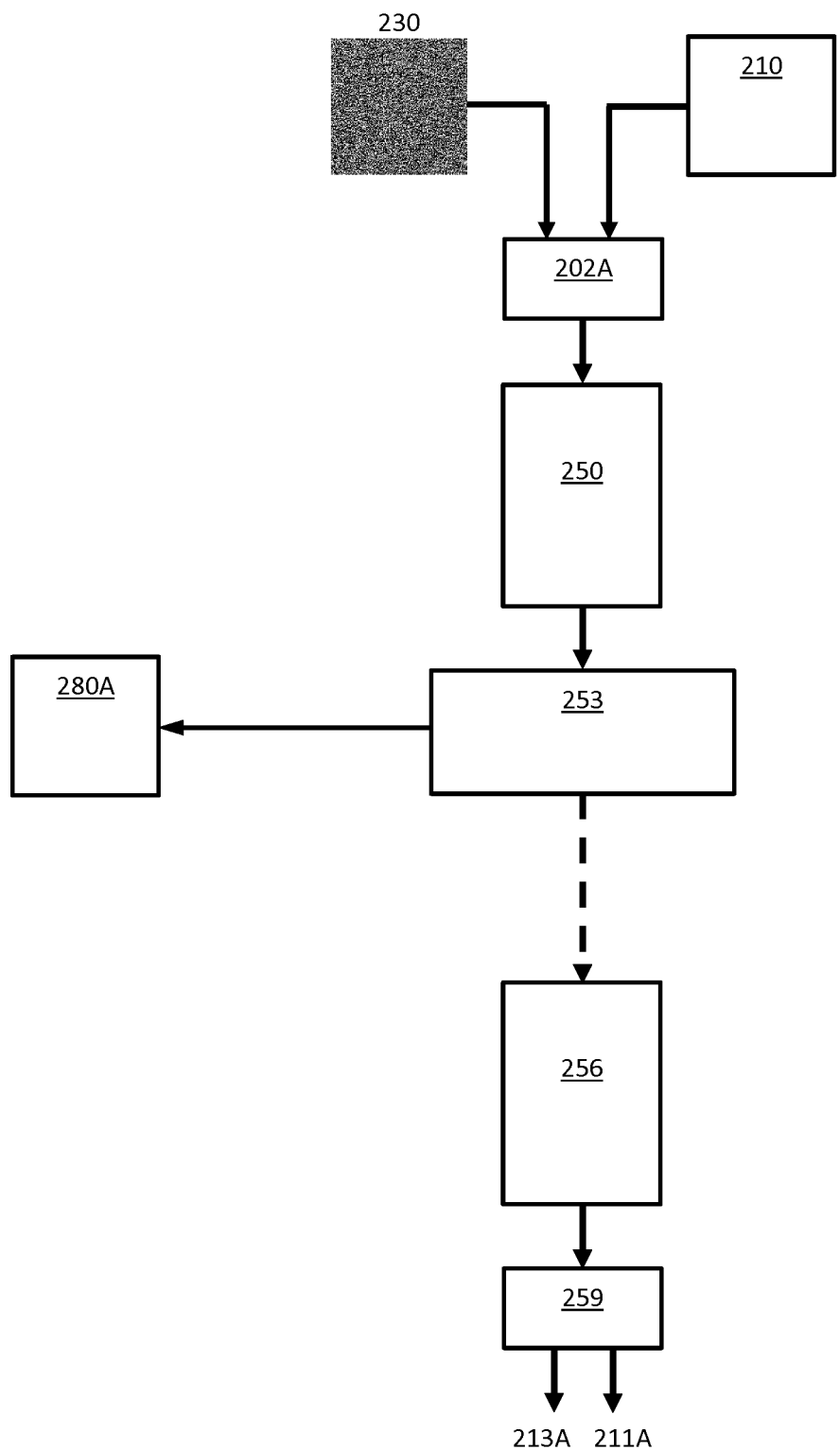
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
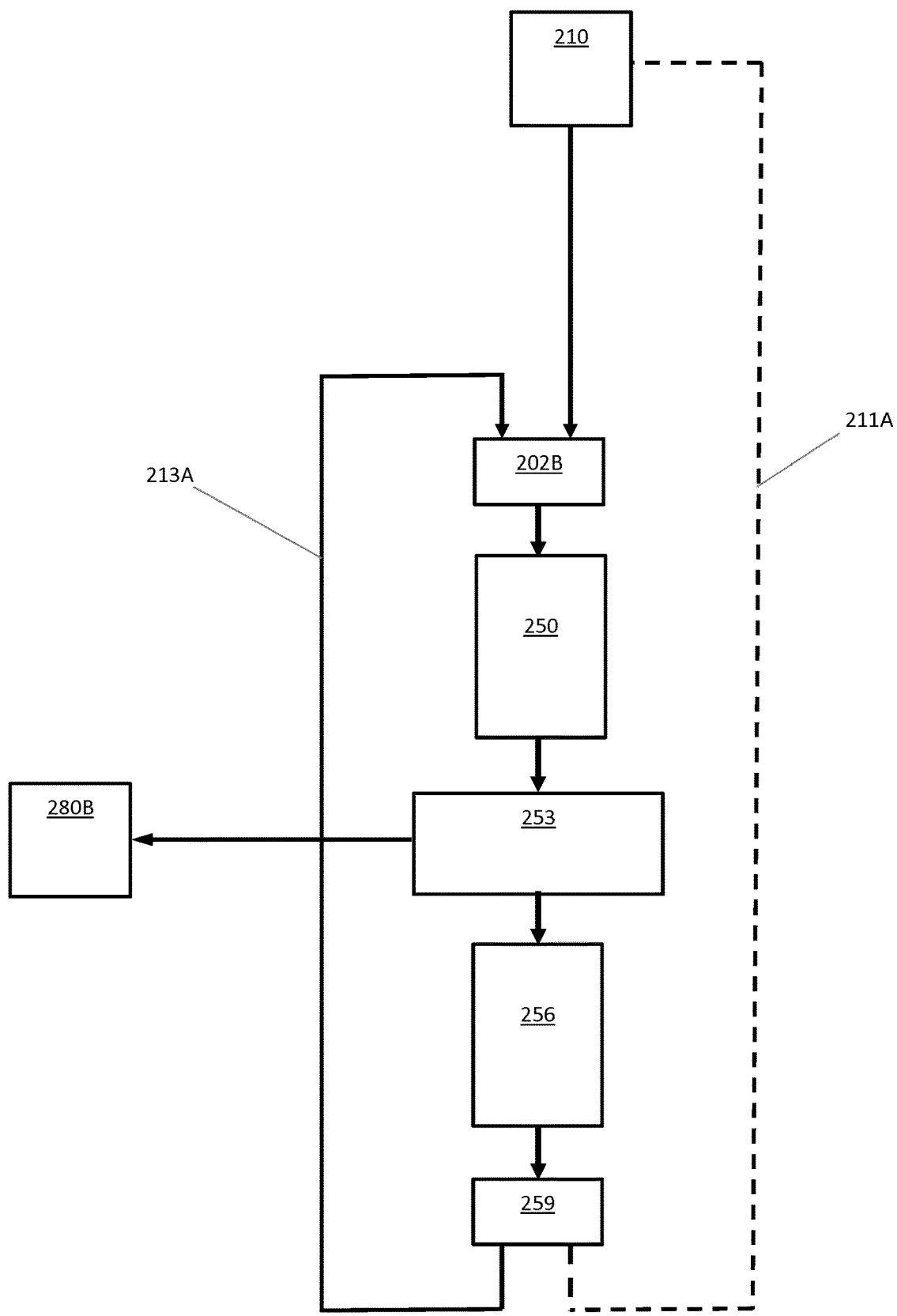
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
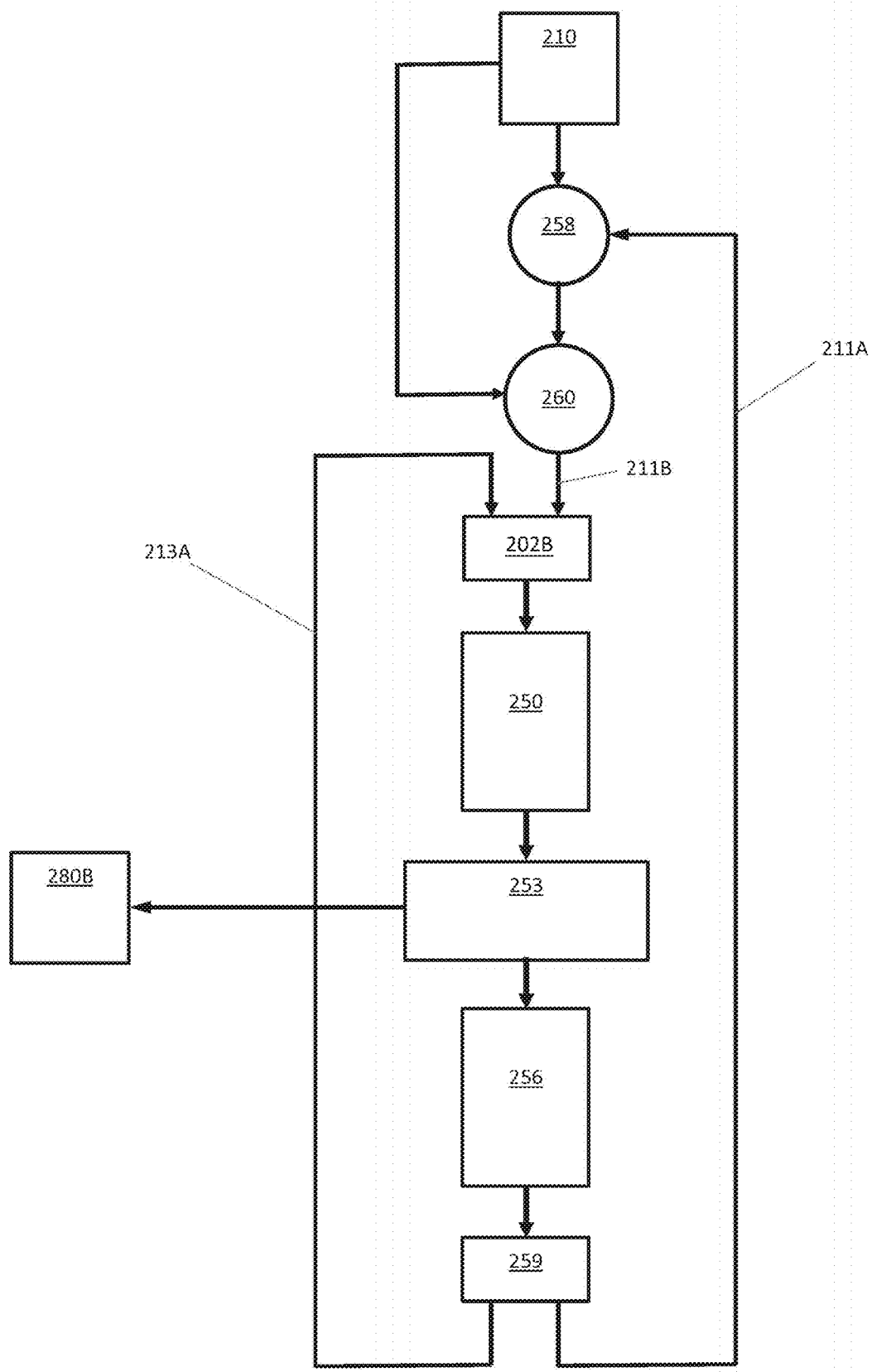
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing blocks 258 and 260 subtracts the distribution of magnitude values of the input image 210 from the distribution of magnitude values

211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
$\angle$ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
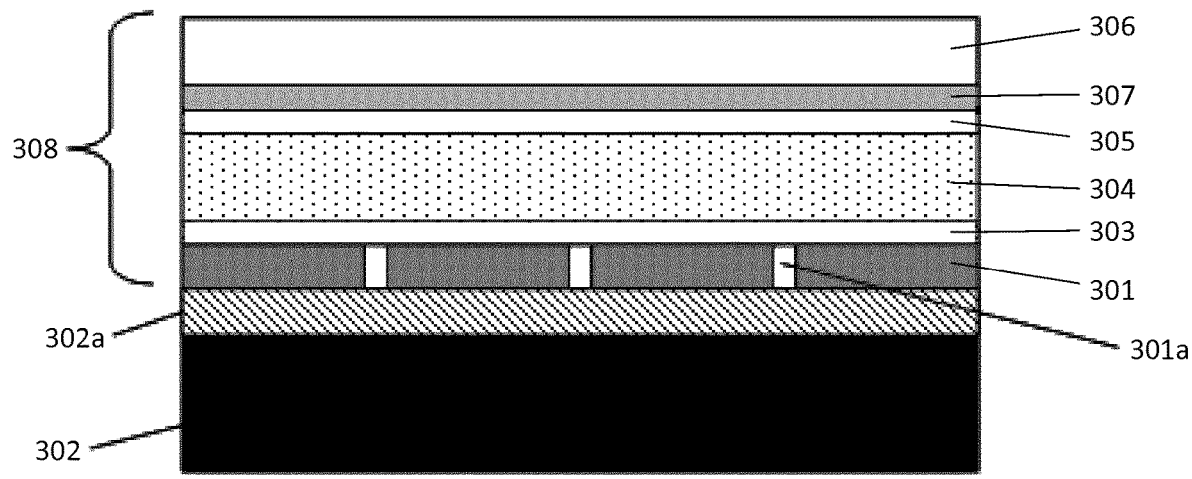
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels (e.g., the gap 301a). By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display

Figure 4:
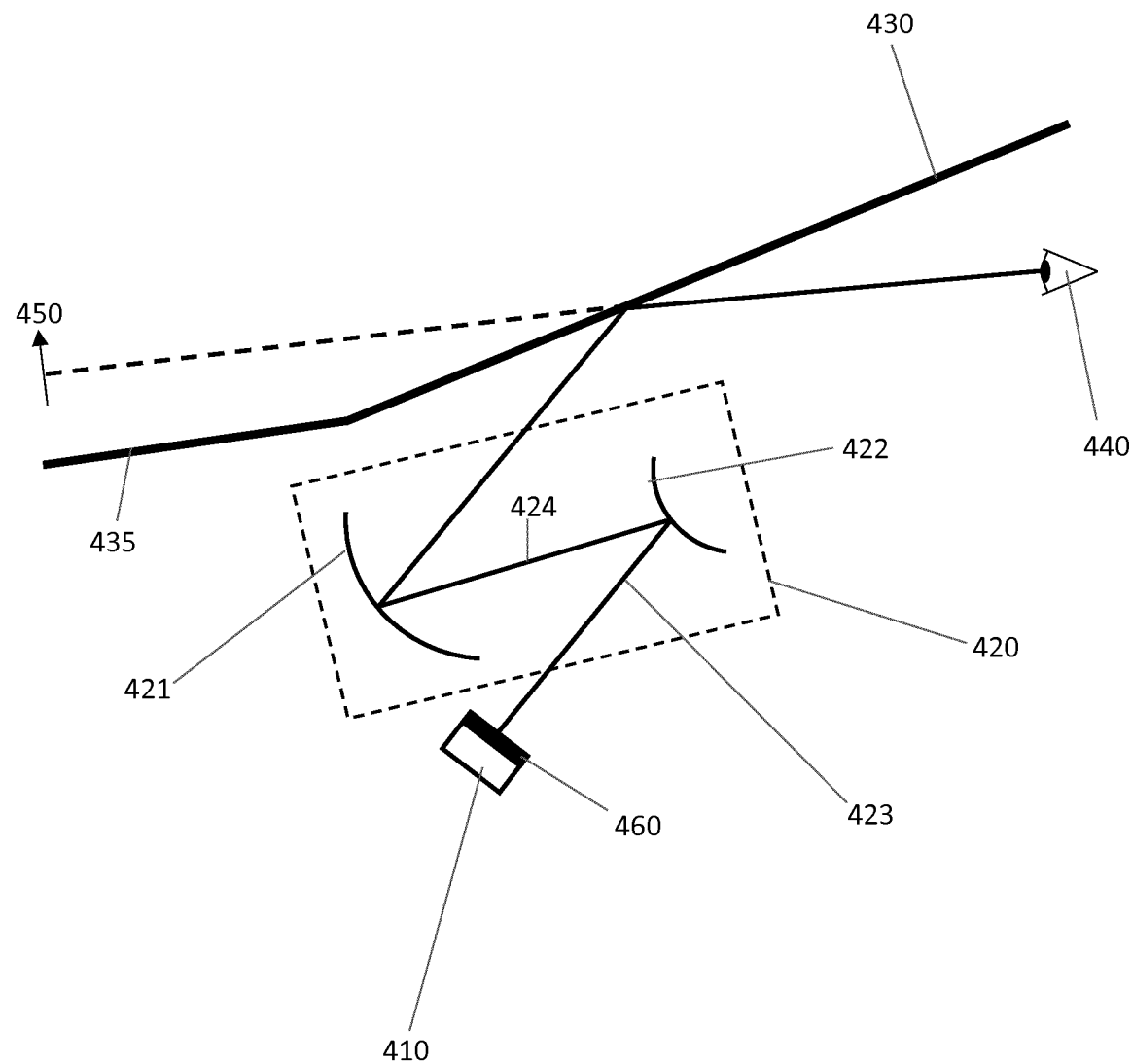
FIG. 4 shows a head-up display.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

The PGU 410 comprises a light source, a light receiving surface 460 and a processor (or computer) arranged to computer-control the image content of the picture. The PGU 410 is arranged to generate a picture, or sequence of pictures, on the light receiving surface 460. The light receiving surface 460 may be a screen or diffuser. In some embodiments, the light receiving surface is plastic (that is, made of plastic). The light receiving surface is disposed on the replay plane. However, the light receiving surface is optional and holographic reconstructions may be formed in free space. The holographic reconstructions formed in accordance with the present disclosure are all formed on a common replay plane. In some embodiments, a plurality of holographic reconstructions are superimposed on the replay plane.

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. In some embodiments, the picture comprises a plurality of superimposed light patterns. The augmented reality information may include navigation information or information related to the speed of the automotive vehicle, for example. In some embodiments, the light forming the picture is output by incident upon the windscreen at Brewster's angle (also known as the polarising angle) or within 5 degrees of Brewster's angle such as within 2 degrees of Brewster's angle.

In some embodiments, the first mirror and second mirror are arranged to fold the optical path from the input to the output to increase the optical path length without overly increasing the physical size of the HUD.

The picture formed on the light receiving surface 460 of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. In some embodiments, the first mirror 421 and second mirror 422 may also at least partially correct for optical distortions such as those caused by the windscreen 430 which typically has a complex curved shape. The folded optical path and optical power in the mirrors together allow for suitable magnification of the virtual image of the picture.

The PGU 410 of the present disclosure comprises at least one holographic projection channel. Each holographic projection channel of the picture generating unit is referred to herein as a display channel. In accordance with the disclosure above, each holographic projection channel comprises a light source, a spatial light modulator and a controller. The spatial light modulator is arranged to spatially-modulate light in accordance with holograms displayed on the spatial light modulator. A controller provides light modulation data (i.e. a light-modulation distribution or an array of light modulation values such as an array of phase-delay values) comprising the computer-generated holograms. The light modulation data may further comprise other functions such as a beam steering function described elsewhere in this disclosure. In some embodiments, the controller selects a computer-generated hologram for output from a repository (e.g. memory) comprising a plurality of computer-generated holograms. In other embodiments, the controller calculates and outputs the computer-generated holograms in real-time. Each picture formed by the PGU 410 is a holographic reconstruction. That is, each picture is formed by interference of the spatially-modulated light on the replay plane.

Display Channels

The present disclosure relates to a system comprising a plurality of single wavelength display channels. In some embodiments, each single wavelength display channel comprises a single wavelength holographic projector forming a single wavelength holographic reconstruction (i.e. light pattern or picture). A plurality of single wavelength light patterns are formed on a common replay plane. A full colour visible image may be formed using coincident red, green and blue holographic reconstructions. In some embodiments, the hologram is a Fourier hologram. In other embodiments, the hologram is a Fresnel hologram.

Figure 5:
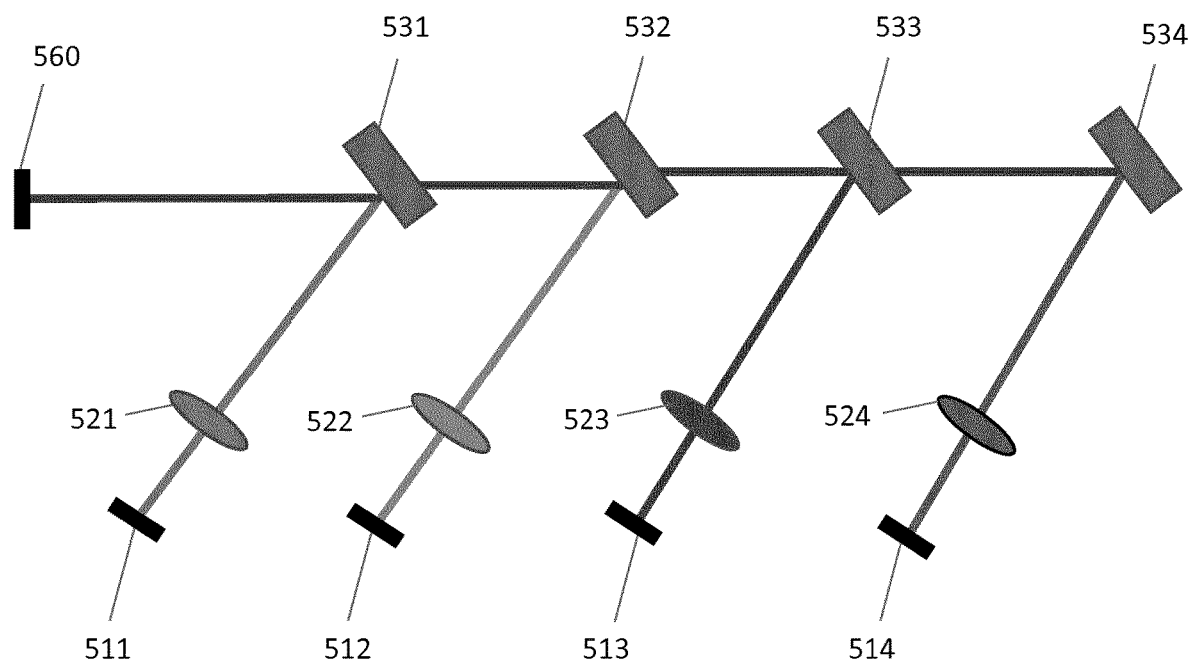
FIG. 5 shows a plurality of display channels in accordance with embodiments.

FIG. 5 shows red, green and blue display channels. The red display channel comprises a first spatial light modulator 511, a first lens 521 and a first mirror 531. The green display channel comprises a second spatial light modulator 512, a second lens 522 and a second mirror 532. The blue display channel comprises a third spatial light modulator 513, a third lens 523 and a third mirror 533. Each single colour display channel forms a single colour holographic reconstruction (or picture) on replay plane 560. The plurality of single colour holographic reconstructions may be superimposed.

The first spatial light modulator 511 displays a hologram corresponding to a red image. The first spatial light modulator 511 is illuminated with red light. The first lens 521 receive spatially modulated light from the first spatial light modulator 511 and forms a red image on the replay plane 560. The first mirror 531 is disposed between the first lens 521 and replay plane 560.

The second spatial light modulator 512 displays a hologram corresponding to a green image. The second spatial light modulator 512 is illuminated with green light. The second lens 522 receive spatially modulated light from the second spatial light modulator 512 and forms a green image on the replay plane 560. The second mirror 532 is disposed between the second lens 522 and replay plane 560.

The third spatial light modulator 513 displays a hologram corresponding to a blue image. The third spatial light modulator 513 is illuminated with blue light. The third lens 523 receive spatially modulated light from the third spatial light modulator 513 and forms a blue image on the replay plane 560. The third mirror 533 is disposed between the third lens 523 and replay plane 560.

The first mirror 531 is a first dichroic mirror arranged to reflect the red light and transmit the green and blue light. The second mirror 532 is a second dichroic mirror arranged to reflect the green light and transmit the blue light. The third mirror 533 is reflective to the blue light.

Each single colour light path comprises a first part from spatial light modulator to mirror and second part from mirror to replay plane. In embodiments, the first parts of the respective single colour display channels are spatially-offset but substantially parallel. In embodiments, the respective second parts of the single colour display channels are substantially colinear.

The red light path from the first spatial light modulator 511 to replay plane 560 comprises a reflection off the first mirror 531. The green light path from second spatial light modulator 512 to replay plane 560 comprises a reflection off second mirror 532 followed by a transmission through the first mirror 531. The blue light path from third spatial light modulator 513 to replay plane 560 comprises a refection off third mirror 533 followed by a transmission through the second mirror 532 and then a transmission through the first mirror 531. The replay plane 560, first mirror 531, second mirror 532 and third mirror 533 are substantially colinear. The blue path length is greater than the green path length which is greater than the red path length. Specifically, in embodiments, the second part of the blue light path is longer than that of the green light path which is, in turn, longer than that of the red light path. In these embodiments, the first parts may be substantially equal in length.

The red, green and blue display channels are part of the picture generating unit of a head-up display. Red, green and blue display channels are described by way of example only. The picture generating unit may comprise any number of single wavelength visible light display channels.

FIG. 5 further shows an infrared display channel comprising a fourth spatial light modulator 514, fourth lens 524 and fourth mirror 534. The infrared display channel also forms a holographic reconstruction on replay plane 560. The holographic reconstruction formed by the infrared display channel is an infrared light pattern. The infrared light pattern may superimpose the picture. That is, the infrared light pattern may at least partially overlap with the single colour light patterns formed by the visible light display channels.

The fourth spatial light modulator 514 displays a hologram corresponding to an infrared light pattern. The fourth spatial light modulator 514 is illuminated with infrared light. The fourth lens 524 receive spatially modulated light from the fourth spatial light modulator 514 and forms an infrared light pattern on the replay plane 560. The fourth mirror 534 is disposed between the first lens 524 and replay plane 560.

The infrared light path from fourth spatial light modulator 514 to replay plane 560 comprises a refection off fourth mirror 524 followed by a transmission through the third mirror 533, then a transmission through the second mirror 532 and finally a transmission through the first mirror 531. The third mirror 533 is therefore also dichroic mirror which is transmissive to the infrared light. The fourth mirror 534 is substantially collinear with the replay plane 560, first mirror 531, second mirror 532 and third mirror 533. It will be apparent to the person skilled in the art that the display channels in the plurality of display channels may be ordered in any way. The person skilled in the art would be able to select the appropriate dichroic mirrors for any ordering of the display channels. The infrared display channels is shown in FIG. 5 as the longest optical path by way of example only. For example, it may be beneficial for the infrared light channel to have the shortest optical path length. Structurally and optically, the infrared display channel is integrated with the visible light display channels. However, functionally, the infrared display channel is not part of the picture generating unit as will be better understood from the following.

Figure 6:
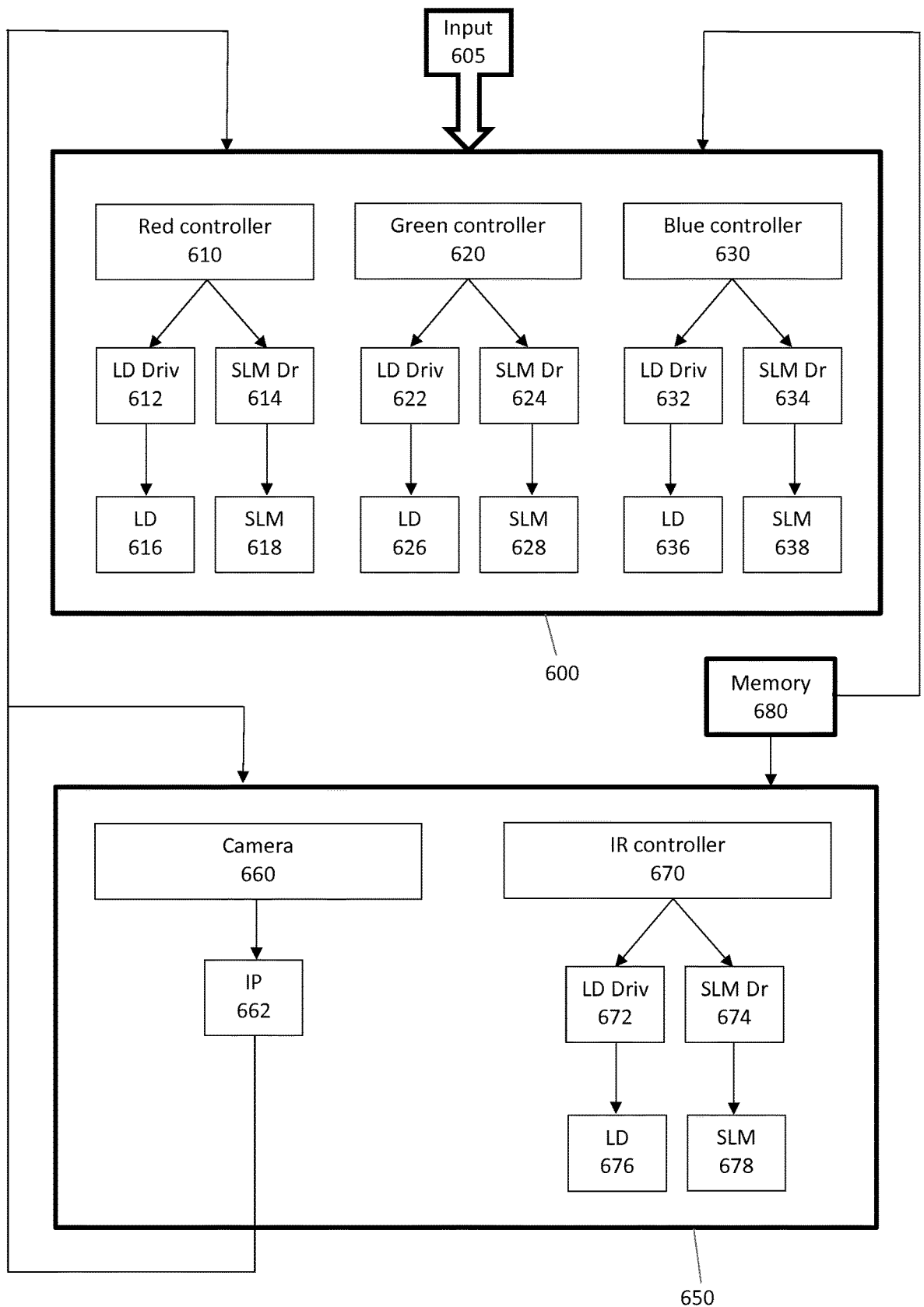
FIG. 6 shows components of the picture generating unit and driver monitoring system in accordance with embodiments.

FIG. 6 shows the key components of the head-up display in accordance with this disclosure. Notably, the components of the infrared display channel are part of a driver monitoring system 650.

Specifically, FIG. 6 shows a picture generating unit 600 comprising a plurality of single colour visible light channels. The picture generating unit 600 is arranged to receive input images 605 for projection. Each visible light channel comprises an individual controller 610, 620, 630 arranged to ensure that the images received for projection are faithfully projected. In the embodiment of FIG. 6, there is provided a red controller 610, green controller 620 and blue controller 630.

The red controller 610 controls the red light display channel arranged to form red light patterns on the replay plane by holographic projection. The wavelength of the red light may be 640 nm+/−25 nm. The green controller 620 controls the green light display channel arranged to form green light patterns on the replay plane by holographic projection. The wavelength of the green light may be 530 nm+/−25 nm. The blue controller 630 controls the blue light display channel arranged to form blue light patterns on the replay plane by holographic projection. The wavelength of the blue light may be 450 nm+/−25 nm. The three single colour light patterns may be superimposed on the replay plane to form a full colour reconstruction of each input image.

The picture generating unit 600 receives a plurality of different inputs which are used to ensure that the input image is faithfully recreated. Each controller 610, 620, 630 coordinates a respective laser diode driver 612, 622, 632 and spatial light modulator driver 614, 624, 634. Each laser diode driver 612, 622, 632 drives a corresponding laser diode 616, 626, 636. Each spatial light modulator driver 614, 624, 634 drives a corresponding spatial light modulator 618, 628, 638. Each controller coordinates a spatial light modulator and laser diode pair such that the required light modulation patterns are displayed and illuminated. In particular, each controller 610, 620, 630 ensures that the respective spatial light modulator 618, 628, 638 is synchronised with the corresponding laser diode 616, 626, 636.

The red controller 610 determines a computer-generated hologram which will reconstruct the red image content of the input image 605 when displayed and illuminated with red light. The red controller 610 may calculate computer-generated holograms based on the red image content or may retrieve pre-calculated computer-generated holograms from memory. The red controller 610 may combine the computer-generated hologram with other functions such as a beam steering function or lensing function, as described elsewhere in this disclosure, in order that a light modulation pattern comprising the computer-generated hologram is appropriately displayed on the respective spatial light modulator. The red controller 610 may distort the red image content of each input image before calculating the hologram in order to compensate for measured non-uniformities in the optics such as the optical combiner.

The green controller 620 determines a computer-generated hologram which will reconstruct the green image content of the input image 605 when displayed and illuminated with red light. The green controller 620 may calculate computer-generated holograms based on the green image content or may retrieve pre-calculated computer-generated holograms from memory. The green controller 620 may combine the computer-generated hologram with other functions such as a beam steering function or lensing function, as described elsewhere in this disclosure, in order that a light modulation pattern comprising the computer-generated hologram is appropriately displayed on the respective spatial light modulator. The green controller 620 may distort the green image content of each input image before calculating the hologram in order to compensate for measured non-uniformities in the optics such as the optical combiner.

The blue controller 630 determines a computer-generated hologram which will reconstruct the blue image content of the input image 605 when displayed and illuminated with red light. The blue controller 630 may calculate computer-generated holograms based on the blue image content or may retrieve pre-calculated computer-generated holograms from memory. The blue controller 630 may combine the computer-generated hologram with other functions such as a beam steering function or lensing function, as described elsewhere in this disclosure, in order that a light modulation pattern comprising the computer-generated hologram is appropriately displayed on the respective spatial light modulator. The blue controller 630 may distort the blue image content of each input image before calculating the hologram in order to compensate for measured non-uniformities in the optics such as the optical combiner.

FIG. 6 further shows a driver monitoring system 650 comprising a camera 660 and IR controller 670. The camera 660 is arranged to capture infrared images of the driver. The driver monitoring system 650 further comprises an image processor 662 arranged to process captured images of the driver and determine an absolute position of the driver or a change in the position of the driver. For example, the image processor 662 may eye-track or head-track. The driver monitoring system 650 outputs data representative of the driver's position. The IR controller 670 comprises a laser diode driver 672, laser diode 676, spatial light modulator driver 674 and spatial light modulator 678 arranged to illuminate the driver with infrared light for improved image capture. The IR wavelength may be 1200 to 1800 nm, such as 1500 to 1600 nm. The IR controller 670 determines a computer-generated hologram which will form an infrared light pattern. The infrared light pattern may be dynamically changed by dynamically changing the displayed light-modulation pattern. For example, the infrared light pattern may be linearly displaced in response to a driver head movement by changing a beam steering (e.g. grating) function combined with the computer-generated hologram. The infrared light pattern may be changed in order to increase the intensity of the infrared light in a region of low reflectivity. The IR controller may receive positional information regarding the driver from the image processor 662 and determine an infrared light pattern based on the positional information. For example, the IR controller may be configured to ensure uniform illumination of the driver's face with IR light. Any desired infrared light pattern may be formed, and the skilled person will understand how the described feedback system may be coordinated with the infrared display channel in order to provide a dynamically changeable IR illumination system for the driver monitoring system 650.

In some embodiments, the head-up display further comprises a memory. The memory may contain a repository of pre-calculated holograms. The memory may contain correction data such as infrared correction map and/or visible light correction map. In some embodiments, a correction map is provided to one or more of the display channel controllers. The infrared correction map may be provided to the controller of the infrared display channel. The visible light correction map may be provided to the controller of the visible light display channel. Each correction map represents the system-wide optical response of the head-up display.

Each correction map is wavelength specific. The infrared correction map is representative of the system-wide optical response of the head-up display to the infrared light of the infrared display channel. The visible light correction map is representative of the system-wide optical response of the head-up display to the visible light of the visible light display channel. The light pattern formed at the replay plane may not be perfected relayed to the eye-box. That is, there may be some unwanted change to the light pattern. For example, the change may be a spatially-variant distortion of the light pattern or a spatially-variant change to the brightness of the light pattern. Again, the change may be wavelength dependent.

In some embodiments, the optical combiner is the windscreen of a vehicle. In some embodiments, the light pattern is formed on a screen (e.g. diffuser) at the replay plane. The change to the light pattern may be caused by optical components of the head-up display such as the optical combiner or screen. In some embodiments, the correction map compensates for the spatially-variant optical power of the windscreen. In some embodiments, the correction map compensates for non-uniform diffusivity of the screen. The correction map provides a system-wide correction which ensures that the light distribution in the eye-box is a faithfully reconstruction of the input image. In accordance with the present disclosure, light patterns are formed by holographic projection from a pixelated display device (i.e. spatial light modulator). The pixelated structure forms a holographic replay field which may be non-uniform in brightness. This non-uniformity is correctable using the correction maps described herein.

In some embodiments, a correction map is provided for a plurality of different head or eye positions of the viewer within the eye-box. More specifically, a unique correction map is provided for each channel and for each of a plurality of head or eye positions of the viewer within the eye-box. This is because the image formed at each viewpoint is formed from a particular bundle of light rays, each light ray of the bundle following a particular light ray path through the system. Light rays may pass through different parts of components (e.g. lens) and may reflect off different parts of other components (e.g. the optical combiner). Head or eye-tracking information is therefore used to determine the infrared correction map output to the controller of the infrared display channel and the visible light correction map output to the controller of the visible light display channel. Each correction map compensates for the system-wide optical response of the head-up display such that each light distribution relayed to the eye-box is faithful to the input (or source) light pattern regardless of eye position within the eye-box.

Each correction map may be determined using ray tracing from different positions within the eye-box. Alternatively, each correction map may be determined in a calibration process. The calibration process may comprise capturing pictures from the eye-box using a camera. That is, the calibration process comprises positioning a camera at different locations in the eye-box and capturing images of the relayed light pattern. The captured images may be compared to the input (or source) image. Differences between each captured image and the input image may be measured at a plurality of points within the eye-box. For example, an array of light spots may be projected into the eye-box. The relative brightness of each light spot can be used to form a brightness correction map for each wavelength. The person skilled in the art will understand how such measurements may be used to form a brightness correction map. The brightness correction map may be considered an array of brightness gain values. Each input image or pattern for projected may be pre-processed using the brightness correction map before the corresponding hologram is determined.

In some embodiments, the picture generating unit receives colour images for projection. The picture generating unit separates the colour image into red, green and blue image components and sends each to a respective single colour display channel. The controller of each single colour display channel pre-processes the received single colour image using the corresponding single colour correction map (e.g. multiple by the inverse of the brightness correction map) and then calculates a hologram corresponding to the single colour image. In some embodiments, each hologram is calculated in real-time using the Fourier hologram calculation method described above. Likewise, the driver monitoring system may determine (e.g. calculate) holograms in real-time corresponding to the desired infrared light patterns after pre-processing image data using an infrared correction map such as an infrared brightness correction map.

It will be understood that, in some embodiments, the picture generating unit and/or driver monitoring system uses feedback, based on a head or eye-tracking system, to change the hologram (or light modulation pattern) and therefore change the projected light pattern. As described above, the infrared light pattern may be moved or shaped to compensate for a head movement. Furthermore, in some embodiments, feedback from head or eye-tracking is used to determine (e.g. select) the correction map from the plurality of correction maps. This is because for each wavelength, the correction map depends on the viewpoint within the eye-box. Therefore, if the viewer moves, a different correction map should be used for each display channel. The described feedback system is used to identify the correction map for the infrared display channel and/or the correction map for the visible light display channel. It will be understood that the correction map is obtained for a plurality of eye-box positions and identifying the appropriate correction map may comprise identifying correction map for the nearest measured viewpoint.

Notably, the general shape of the infrared light pattern which illuminates the viewer within the eye-box area is dynamically reconfigurable using a computer-generated holography. Accordingly, it is not necessary to broadly flood the inside of a vehicle with infrared light to ensure that head or eye-tracking data can be obtained. Furthermore, the infrared display channel is relayed by the same optical system as the pictures of the picture generating unit. Therefore, the infrared light field is advantageously confined to the eye-box area. That is, the area outside the eye-box is not unnecessarily illuminated with infrared light. In some embodiments, the optical combiner comprises an optical coating configured to increase reflectivity at the infrared wavelength. In some embodiments, the camera of the driver monitoring system is disposed behind one of the mirrors of the optical system and the mirror is suitable transmissive at the infrared wavelength. In other embodiments, the camera is position behind the dichroic mirror (e.g. the first mirror 531) of one of the visible light display channels (e.g. the red light display channel).

Other Example

Figure 7A:
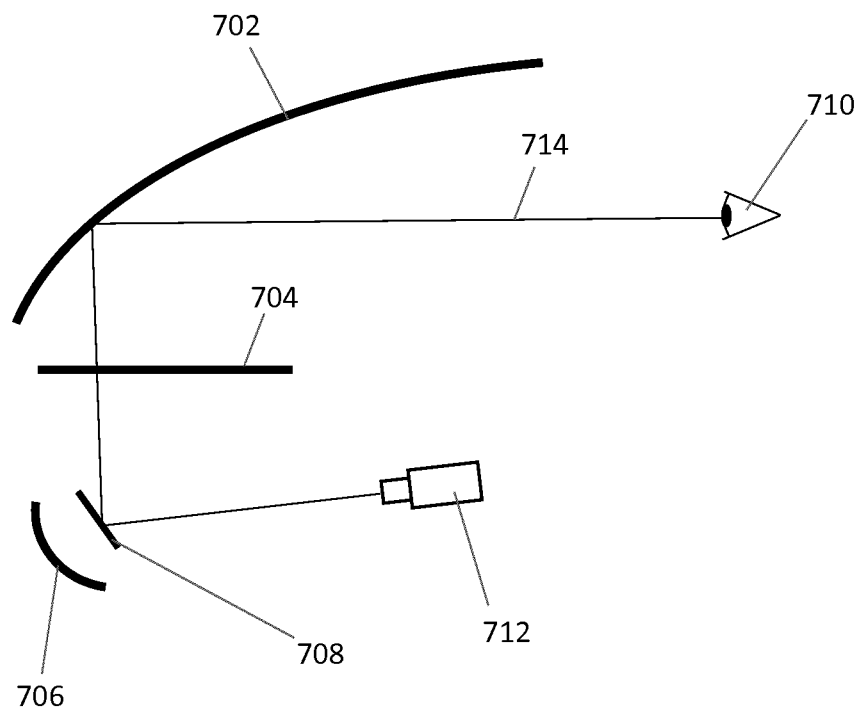
FIGS. 7A and 7B show another example head-up display including an integrated IR emitters.
Figure 7B:
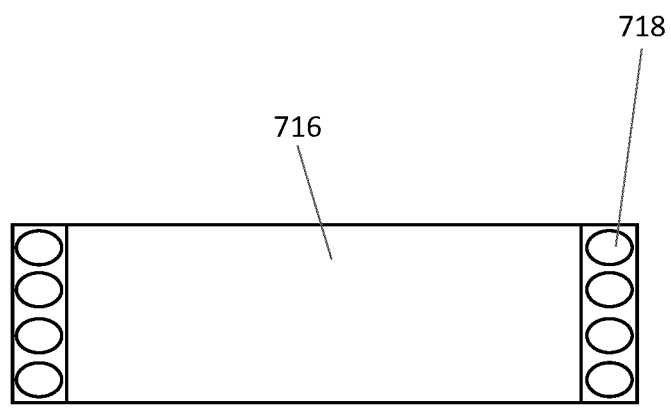

FIGS. 7A and 7B shows an example head-up display system including a driver monitoring system including an infrared illumination system and image capture device.

FIG. 7A shows a cross-section through the head-up display system. The head-up display comprises a freeform mirror 706 arranged to relay light of the picture from a picture generating unit (not show) to a viewer 710 in an eye-box. The head-up display includes a glare trap 704. FIG. 7A shows an infrared light path 714 from the viewer 710 to an infrared image capture device 712. The viewer 710 is illuminated with infrared light as will be explained below with reference to FIG. 7B. The infrared light path 714 includes a reflection off the inner surface of the vehicle windscreen 702 and a reflection of a beam-splitter 708. The beam-splitter 708 is reflective to infrared light and transmissive to visible light. The beam-splitter 708 does not therefore disrupt light of the visible light pattern or patterns. Notably, the infrared image capture device 712 is located within the volume of the head-up display. The infrared camera is disposed below the cover glass. The glare trap 704 is transmissive to infrared light.

FIG. 7B shows a top view of the glare trap 704. An array of infrared light sources, such as infrared light source 718, are packaged next to the glare trap. Optionally, the infrared light sources are packaged utilising a camo film 716 which is non-transmissive to visible light and transparent to infrared light. The infrared light sources are arranged to emit infrared light. All the emitted infrared light is directed to the eye-box.

There is therefore provided a head-up display comprising: a picture generating unit, an optical system comprising at least one mirror, a cover glass and a beam-splitter which is reflective to infrared light and transmissive to visible light, wherein the head-up display is characterised by further comprising an infrared image capture device disposed within the volume of the optical system and a plurality of infrared light sources packaged on top of the glare trap, wherein the infrared light sources are arranged to only illuminate the eye-box area.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In embodiments, the holographic reconstruction is colour. In some embodiments, an approach known as spatially-separated colours, "SSC", is used to provide colour holographic reconstruction. The method of SSC uses three spatially-separated spatial light modulators for the three single-colour holograms. An advantage of the SSC method is that the image can be very bright because all three holographic reconstructions may be formed at the same time.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle arranged to be operated by a driver having an eye positioned within an eye-box, the head-up display comprising:
 a driver monitoring system arranged to illuminate and monitor a driver, wherein the driver monitoring system comprises an infrared display channel comprising:
  an infrared light source arranged to emit infrared light; and
  a first spatial light modulator arranged to display a light-modulation distribution comprising computer-generated first hologram, the first spatial light modulator being arranged to receive the infrared light from the infrared light source and output spatially-modulated light in accordance with the first hologram to form an infrared light pattern on a replay plane; and
  a first controller arranged to output the first light-modulation distribution to the first spatial light modulator;
 an infrared camera arranged to obtain infrared images of the driver in the eye-box; and
 an image processor arranged to receive captured images of the driver from the infrared camera and to determine an absolute position of the driver in the eye-box and/or a change in position of the driver in the eye-box and output to the first controller data representative of the position of the driver in the eye-box,
 wherein the first controller is arranged to change the first light-modulation distribution based on the data representative of the position of the driver in the eye-box;
 a picture generating unit arranged to display a picture on the replay plane, wherein the picture generating unit comprises a visible light display channel, wherein the visible light display channel comprises:
  a visible light source arranged to emit visible light;
  a second spatial light modulator arranged to display a second hologram, the second hologram being computer-generated, and to receive the visible light from the visible light source and output spatially-modulated light in accordance with the computer-generated second hologram displayed on the second spatial light modulator to form a visible light pattern on the replay plane; and
  a controller arranged to output a second light-modulation distribution comprising the computer-generated hologram to the second spatial light modulator; and
 an optical system arranged to relay the infrared light pattern and the visible light pattern from the replay plane to an optical combiner arranged to direct the relayed light to the eye-box, to provide to the eye-box a combined view that is a combination of a view of the relayed visible light with a view of an area viewable by driver from the eye-box through the optical combiner, such that the infrared light pattern illuminates the driver in the eye-box to provide an illuminated area for an image of the driver obtained by the infrared camera and such that the visible light pattern is visible within the eye-box, wherein the optical system is configured to receive the infrared light pattern and the visible light pattern from the replay plane and to output light of the infrared light pattern and light of the visible light pattern to the optical combiner; and comprises:

at least one mirror arranged to guide light from the replay plane to the optical combiner along an optical path.

2. A head-up display as claimed in claim 1 further arranged such that all infrared light from the infrared display channel is directed to the eye-box.

3. A head-up display as claimed in claim 1 wherein the light pattern formed by the infrared display channel is a structured or shaped infrared light pattern.

4. A head-up display as claimed in claim 1 wherein the intensity of the infrared light illuminating the eye-box is substantially uniform.

5. A head-up display as claimed in claim 1 wherein the infrared display channel is at least partially integrated with the visible light channel.

6. A head-up display as claimed in claim 1 wherein at least a portion of the infrared display channel is substantially collinear with a corresponding portion of the visible light display channel.

7. A head-up display as claimed in claim 1 wherein the controller of the infrared display channel is arranged to:

receive a first input comprising a light pattern for projection using infrared light;

receive a second input comprising infrared correction data based on the change in position of the driver; and determine the first light-modulation distribution based on the first input and second input.

8. A head-up display as claimed in claim 1 wherein the controller of the visible light display channel is further arranged to:

receive a first input comprising an image for projection using visible light;

receive a second input comprising visible light correction data; and determine the second light-modulation distribution based on the first input and second input.

9. A head-up display as claimed in claim 1 wherein the first hologram is a fixed holographic recording in a recording medium.

10. A head-up display as claimed in claim 1 wherein the angle of reflection off the optical combiner is approximately equal to Brewster's angle.

11. A head-up display as claimed in claim 1, wherein the light emitted by each light source is polarized.

12. A head-up display as claimed in claim 1, wherein each light source is a laser diode.

13. A method for providing a head-up display in a vehicle operated by a driver having an eye positioned within an eye-box, the method comprising:

illuminating and monitoring the driver by steps including:

emitting infrared light from an infrared light source, receiving the infrared light at a first spatial light modulator displaying a first light-modulation distribution comprising a computer-generated first hologram and outputting spatially-modulated light from the first spatial light modulator to form an infrared light pattern on a replay plane, obtaining infrared images of the driver in the eye-box with an infrared camera, receiving captured images of the driver from the infrared camera and determining an absolute position of the driver in the eye-box and/or a change in position of the driver in the eye-box to provide data representative of the position of the driver in the eye-box, and changing the first light-modulation distribution based on the data representative of the position of the driver in the eye-box;

displaying a picture on the replay plane by steps including emitting visible light from a visible light source, displaying a second hologram that is a second light-modulation distribution on a second spatial light modulator, the second hologram being a computer-generated hologram, and receiving the visible light at the second spatial light modulator and outputting spatially-modulated light in accordance with the computer-generated second hologram displayed on the second spatial light modulator to form a visible light pattern on the replay plane; and relaying the infrared light pattern and the visible light pattern from the replay plane to the eye-box by an optical combiner, to provide to the eye-box a combined view that is a combination of a view of the relayed visible light with a view of an area viewable by the driver from the eye-box through the optical combiner, such that the infrared light pattern illuminates the driver in the eye-box to provide an illuminated area for an image of the driver obtained by the infrared camera and such that the visible light pattern is visible within the eye-box.

14. The method of claim 13, further comprising processing the infrared images of the driver to provide an input to a controller and using the input to provide the second light-modulation distribution to the second spatial-light modulator.

15. The system of claim 1, wherein the optical combiner is a windshield of the vehicle.

16. The method of claim 13, wherein the optical combiner is a windshield of the vehicle.

17. The method of claim 13, wherein the data representative of the position of the driver in the eye-box indicates a motion of a head of the driver, and the change of the first light-modulation distribution results in a displacement of the infrared light pattern.

18. The method of claim 13, wherein the infrared light pattern provides uniform illumination of a face of the driver.

* * * * *